F. CHEVALIER.
CLOSURE HOLDING MEANS FOR ANTIFRICTION WHEELS.
APPLICATION FILED SEPT. 16, 1918.
1,301,386. Patented Apr. 22, 1919.
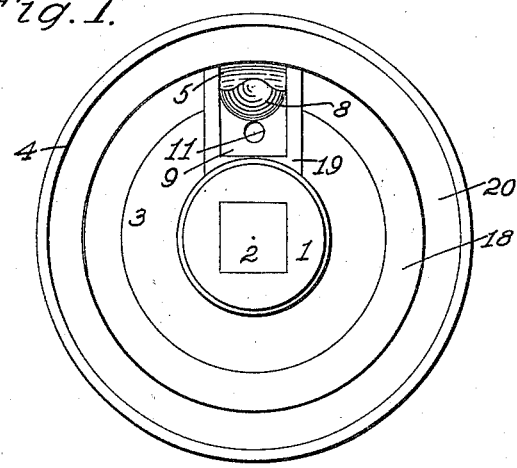
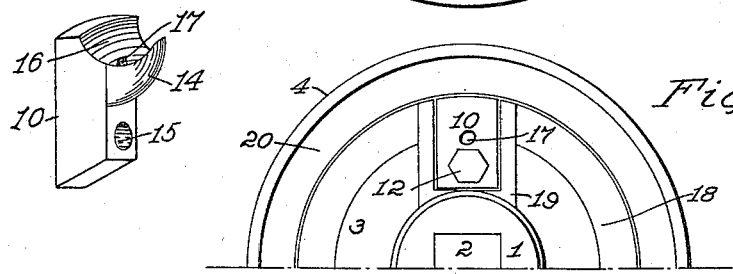
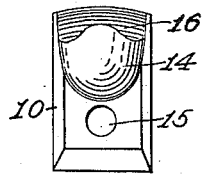
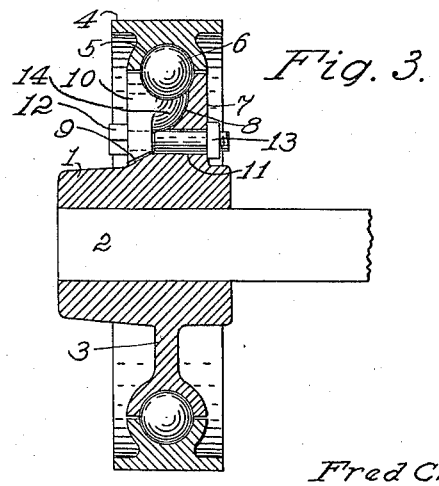
INVENTOR.
Fred Chevalier,
BY
ATTORNEY

UNITED STATES PATENT OFFICE.

FRED CHEVALIER, OF WATERLOO, IOWA.

CLOSURE-HOLDING MEANS FOR ANTIFRICTION-WHEELS.

1,301,386.      Specification of Letters Patent.    Patented Apr. 22, 1919.

Application filed September 16, 1918. Serial No. 254,343.

*To all whom it may concern:*

Be it known that I, FRED CHEVALIER, a citizen of the United States, residing at Waterloo, in the county of Blackhawk and State of Iowa, have invented certain new and useful Improvements in Closure-Holding Means for Antifriction-Wheels, of which the following is a specification.

My invention relates to improvements in closure holding-means for anti-friction wheels, and the object of my improvement is to provide a closure-block for the ball-passage recess of such a wheel with means for detachably interlocking it to the wheel, while also the block is removed, providing a special ball-passage from said recess to the raceway of the wheel.

This object I have accomplished by the means which are hereinafter described and claimed, and which are illustrated in the accompanying drawings, in which Figure 1 is an elevation of the outer face of an anti-friction wheel, showing its ball-passage recess and passage, with the closure-block therefor removed; Fig. 2 is an elevation of the upper half only of said wheel, showing said closure-block secured in place in said recess and passage; Fig. 3 is a central vertical cross-section of said wheel, with the closure-block in position; Fig. 4 is a detail perspective view of said closure-block, and Fig. 5 is another detail perspective view thereof, as viewed from the inside.

Similar numerals of reference denote corresponding parts throughout the several views.

My improved anti-friction wheel is of the type of those employed as carrying-wheels for trucks and the like, and comprises a discoidal center 1 with annular web 3 and outer widened margin 18, the latter having its circumferential periphery annularly troughed to provide the inner half of a raceway 5 for a plurality of anti-friction balls 6. A tread-rim 4 is rotatably mounted about said center body, and has a raceway half registering with the raceway half in the center body, and located in its inner annular widened part 20.

In order to get the balls 6 into or out of said raceway, I provide the follows means. The numeral 19 denotes raised flanges extending from the outer face of the center 1—3 opposite a thickened part 7 thereof, which affords backing to permit the location of a recess 9 between said flanges, generally of oblong shape, with outwardly sloping side walls, said recess extending at its outer end into the raceway 5. The inner end of the recess is also sloped outwardly, so that a closure-block 10 may be fitted therein to be inserted somewhat slopingly for ease in fitting it into the recess, or withdrawing it therefrom.

The closure-block 10 and the thickened part 7 of the center-body having registering bolt-holes 15—11, to receive a bolt 12, having a securing-nut 13, to detachably fasten the block 10 in said recess 9.

The recess 9 has a reëntrant part 8, of concave or other shape such as will permit passage therethrough of the balls 6 into or from the raceway 5, from the recess. The closure-block 10 has a boss 14 which is outwardly convex or shaped to fit said hollow 8 when the block is placed in said recess. The block has also a transverse orifice 17 extending from its front face into said raceway, for the introduction of lubrication oil. The upper end of the block has a segment groove 16 forming, when the block is in place in the recess 9, a part of the raceway 5. The center of the part 1 is cored out rectangularly to receive an end of a relatively fixed squared axle 2, the latter being secured fixedly therein.

The beveled sides of the block 10 fit the like beveled slopes of the recess 9 to allow easy placing or removal of the block, while the boss 14 interlocks with the like-formed hollow or ball-passage 8 to hold the block in place and from sidewise displacement.

Having described my invention, what I claim as new, and desire to secure by Letters Patent, is:

1. An anti-friction wheel having a relatively fixed discoidal center and an annular rim rotatable therearound, said center and said rim having registering raceway grooves, anti-friction balls in said raceway, said center having a recess opening into the raceway, said recess having a concave ball-passage leading into the raceway to permit introduction or removal of balls into or from the raceway, a closure for said recess formed to fit its contours and having a convex boss adapted to fit said ball-passage to interlock therewith against sidewise displacement, and fastening-means for securing the block removably in said recess and passage.

2. An anti-friction wheel having a relatively fixed discoidal center and an annular tread rim mounted rotatably thereon, said center and rim having registering parts of the same annular ball raceway, said center having a ball-passage leading slopingly into said raceway with outwardly sloped side walls and a reëntrant passage into the raceway of the form of a segment of a spherical surface, and a block formed to fit the interior contour of said ball-passage including its segmental spherical part, and removable outwardly slopingly to permit of the introduction of balls into the raceway, or their removal therefrom.

In testimony whereof I affix my signature.

FRED CHEVALIER.